United States Patent

[11] 3,631,725

| [72] | Inventor | James Velasco<br>Beltsville, Md. |
|---|---|---|
| [21] | Appl. No. | 870,514 |
| [22] | Filed | Nov. 25, 1969 |
| [45] | Patented | Jan. 4, 1972 |
| [73] | Assignee | The United States of America as represented by the Secretary of Agriculture |

[54] AUTOMATIC TRANSFER FLASK
2 Claims, 3 Drawing Figs.

[52] U.S. Cl. ............................................. 73/422 GC
[51] Int. Cl. ............................................. G01n 1/10
[50] Field of Search ............................................. 73/422 R, 421, 422 GC, 61.1 C

[56] References Cited
UNITED STATES PATENTS

| 2,644,333 | 7/1953 | Duus | 73/421 |
| 3,241,923 | 3/1966 | Ferrari | 73/422 UX |
| 3,313,419 | 4/1967 | Schlitt | 73/61.1 |

*Primary Examiner*—S. Clement Swisher
*Assistant Examiner*—William A. Henry, II
*Attorneys*—R. Hoffman and W. Bier

ABSTRACT: An automatic transfer flask having a solid partition through which one arm of a U-tube extends. The other arm of the U-tube terminates in a well in the partition. A sample can be weighed directly into the flask and transferred automatically through siphoning action in the U-tube to a chromatographic column or other receptacle by adding sufficient solvent to bring the liquid level in the flask above the bend in the U-tube.

PATENTED JAN 4 1972

3,631,725

INVENTOR.
JAMES VELASCO
BY R. Hoffman &
   W. Bier
ATTORNEYS

AUTOMATIC TRANSFER FLASK

A nonexclusive, irrevocable, royalty-free license in the invention herein described, throughout the world for all purposes of the U.S. Government, with the power to grant sublicenses for such purposes, is hereby granted to the Government of the United States of America.

This invention relates to an apparatus for weighing and quantitatively transferring liquid samples onto a chromatographic column or to any other container. More particularly, this invention relates to an apparatus containing an automatic siphoning device thus providing a means for weighing and transferring liquid samples automatically and quantitatively.

The apparatus of this invention is particularly useful in the determination of the total neutral oil in natural fats and oils and provides a much-needed means for greatly improving the accuracy and efficiency of neutral oil determinations. Prior to this invention, the directions of the official method of the American Oil Chemists' Society for determining neutral oil provided for weighing the fat or oil into a 50-ml. beaker and transferring the sample to a chromatographic column by successive washings with solvent. As can easily be understood, such a method requires extremely careful handling in order to assure a quantitative transfer and involves considerable possibilities for error.

It is an object of this invention to provide an apparatus to eliminate manual transfer of weighed oil samples to a chromatographic column or other receptacle.

Another object of this invention is to provide an apparatus from which a weighed sample of oil can be automatically and quantitatively transferred to a chromatographic column or other receptacle.

According to this invention the above objects are accomplished by a flask having a partition through which extends in a downward direction an elongated arm of a U-tube. The other arm of the U-tube terminates in a well made by indenting slightly a small area of the partition. Although standard tapered joints are not a requisite of the invention, the flask and the elongated arm of the U-tube are, for the sake of convenience, provided with such joints.

In order to weigh a sample into the flask, a weighing base having a standard taper of the same size as that on the bottom of the flask is provided. The flask is thus fitted into the weighing base and the whole unit placed on an analytical or other type balance. After the sample is introduced into the flask and weighed, an extension tube is attached to the elongated arm of the U-tube and the complete unit is fitted onto the top of the chromatographic column. The oil or fat in the flask is diluted with solvent and then the reservoir is fitted onto the top of the flask. When the liquid level in the flask rises above the level of the bend in the U-tube the diluted oil or fat starts siphoning into the chromatographic column.

The invention will now be described in relation to the following drawings in which.

Figure 1:
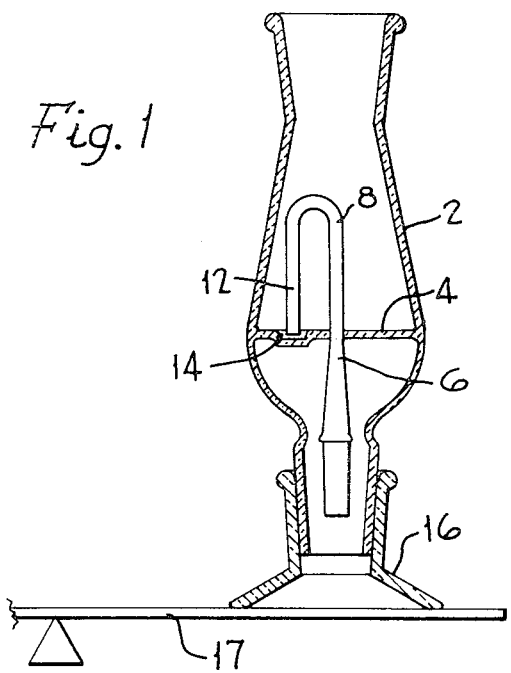
FIG. 1 is a cross-sectional view of the flask and weighing base.
Figure 2:
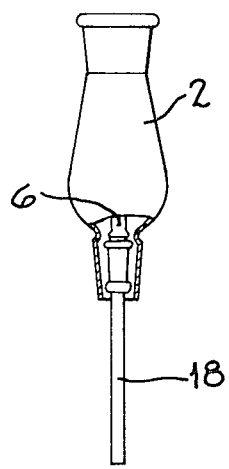
FIG. 2 is a elevational view of the flask associated with an extension tube for use with a column and reservoir.
Figure 3:
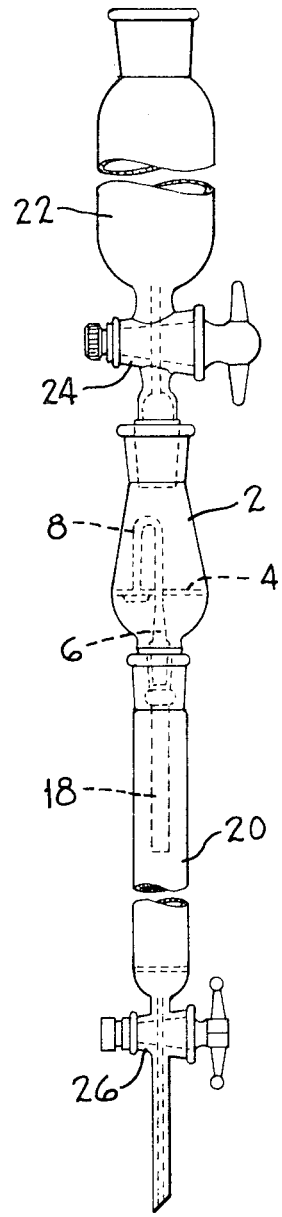
FIG. 3 is an elevational view of the total assembly-flask and extension tube with a column and solvent reservoir.

The flask 2 is fitted with a solid partition 4 through which elongated arm 6 of U-tube 8 extends. The other arm 12 of U-tube 8 terminates in well 14 in partition 4. Weighing base 16 provides a stable platform for flask 2 on a balance pan 17 or other weighing device. After a sample has been weighed extension tube 18, FIG. 2, is attached to elongated arm 6, flask 2 with extension tube 18 attached is fitted into the top of column 20 (FIG. 3). The neck and sides of flask 2 are washed down with solvent, enough of which is added to dilute and mix with the sample and raise the liquid level in flash 2 to about the top of the bend in U-tube 8. Reservoir 22 containing solvent is fitted into the top of flask 2, stopcock 24 is opened partially to raise the liquid level in flask 2 above the top of the bend in U-tube 8, thereby starting the siphoning action by which the sample is transferred to column 20. Stopcock 26 is then opened partially and used to adjust the flow rate.

Use of the automatic transfer flask of this invention to determine neutral oil is described in J.A.O.C.S. 46, 252–255, 1969.

I claim:

1. An apparatus for automatically and quantitatively transferring oil and fat samples, comprising:
   a. a flask:
   b. a solid partition dividing said flask into an upper portion and a lower portion and having a small well on the upper side; and
   c. a U-tube having one arm extending downwardly through said partition and another arm terminating in said well.

2. A method of transferring oil and fat samples automatically and quantitatively to a chromatographic column, comprising the steps of:
   a. weighing the sample into a flask, said flask being divided by a solid partition into an upper portion and a lower portion, and said flask containing a U-tube having one arm extending downwardly through said partition and a second arm extending downwardly and terminating at said partition;
   b. fitting said flask onto a chromatographic column;
   c. diluting the sample with solvent until the liquid level in the flask is above the top of the bend in the U-tube; and
   d. siphoning the diluted sample from the flaSk onto the chromatographic column.

* * * * *